INVENTOR.
J. E. PRITCHARD

United States Patent Office 3,501,207
Patented Mar. 17, 1970

---

3,501,207
PROTECTION OF BEARINGS FROM IMPACT DAMAGE
James E. Pritchard, Bartlesville, Okla., assignor to Phillips Petroleum Company, a corporation of Delaware
Continuation-in-part of application Ser. No. 690,568, Dec. 14, 1967. This application Apr. 10, 1968, Ser. No. 720,207
Int. Cl. F16c 29/08, 33/00, 7/04
U.S. Cl. 308—187
13 Claims

ABSTRACT OF THE DISCLOSURE

Impact damage on races of vehicle wheel bearings caused by repeated impact of rolling members thereupon, for example, caused by vibrations induced by rail shipment of motor vehicles, is prevented by inserting a sleeve of a mesh made from threads of material made from certain polymers and copolymers of 1-olefins between the race and rolling members in the bearings. Alternatively olefin polymer filaments are incorporated in grease which is used for packing wheel bearings at the factory prior to shipment.

CROSS-REFERENCES TO RELATED APPLICATIONS

This is a continuation-in-part of my copending application entitled "Protection of Bearings from Impact Damage," Ser. No. 690,568, filed Dec. 14, 1967.

BACKGROUND OF THE INVENTION

This invention relates to vehicle wheel bearings. In another aspect, this invention relates to improved front wheel vehicle wheel bearings. In still another aspect, this invention relates to a method of preventing impact damage to wheel bearing components.

Wheel bearings in motor vehicles are often damaged during shipment by rail or motor carriers over long distances. This damage results because of repeated impact of the rolling members of the bearing upon the race members of the bearing. This damage is generally known as "impact damage" or "fretting corrosion" and occurs most frequently as pitting or rough areas on the outer race or cup in front wheel bearings of automobiles and the like.

Thus, wheel bearing impact damage results in high inspection and replacement cost of front wheel bearings of motor vehicles which are shipped great distances by rail or motor carriers. Most frequently, this impact damage occurs in front wheel bearings of new automobiles shipped by rail from the factory to retail distibutors.

SUMMARY OF THE INVENTION

One object of this invention is to provide a method of preventing impact damage on wheel bearings of vehicles shipped by rail or motor carrier.

Another object of this invention is to provide an improved wheel bearing for vehicles.

A further object of this invention is to provide a grease formulation for use in packing wheel bearings at the factory prior to shipment.

According to this invention, the above-described impact damage is prevented by providing between the race and the rolling member a formulation comprising grease and olefin polymer filaments which prevent direct contact between the race and the rolling members. This can be done by inserting a sleeve of a mesh made from threads of materials selected from polymers and copolymers of 1-olefins having from 2 to 8 carbon atoms, between the race and rolling components of vehicle wheel bearings, or by packing the wheel bearings at the factory with grease containing from 0.10 to 20, preferably from 0.5 to 10 weight percent based on the weight of said grease of filaments having an average length of at least 0.1, preferably at least 0.2 inch, said filaments being made of materials selected from the group consisting of polymers and copolymers of mono-1-olefins having from 2 to 8 carbon atoms per molecule. The maximum length can vary widely; staple having a maximum length of 1 inch is particularly suitable.

BRIEF DESCRIPTION OF THE DRAWINGS

This invention can be understood more easily from a study of the drawing in which.

DESCRIPTION OF THE PREFERRED EMBODIMENTS

Figure 1:
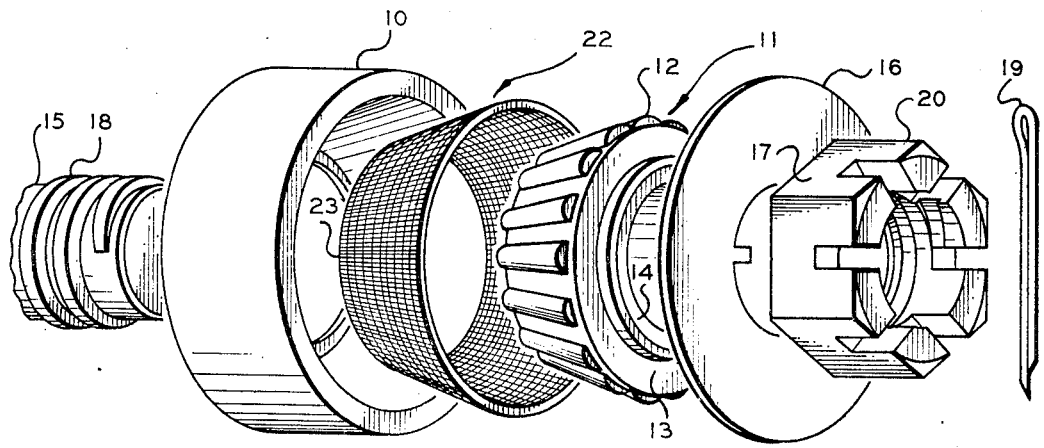
FIGURE 1 is an exploded view of an improved vehicle front wheel bearing of this invention having retained rollers fixed on the inner race.

Now referring to FIGURE 1, outer race or cup 10 is normally pressed into a recess of a motor vehicle wheel hub (not shown) and thereby rotates with the wheel hub. Roller bearing member 11 comprises tapered rollers 12 retained by ring 13 on inner race or cone 14. Roller bearing member 11 normally fits on axle 15 within outer race 10, and is held in place by washer 16 and nut 17 which is screwed onto threaded portion 18 of axle 15. When the bearing is in place, key 19 is inserted between spokes 20 of nut 17 and passed through annulus (not shown) in axle 15.

According to this invention, sleeve 22 is inserted between outer race 10 and roller bearing member 11 either before or after the vehicle is loaded on a railroad car or a motor carrier for shipment. Sleeve 22 is a mesh made of threads of material selected from polymers and copolymers of 1-olefins having from 2 to 8 carbon atoms.

Examples of suitable polymers and copolymers include polyethylene, polypropylene, polybutene-1, ethylene-propylene copolymer, ethylene-butene-1 copolymer, and the like. The most preferred polymer is polyethylene having a density of from 0.94 to 0.98 gm./cc. as determined by ASTM D–792. These olefin polymers are unique in that grease containing fibers made from these polymers exhibit a dramatic and unpredictable improvement in the ability to protect against impact-type wear; yet when the bearing is ready to be put in normal rolling service, no inspection, disassembly or adjustment is necessary. Rather the fibers simply disintegrate and become a part of the grease. In fact after the bearing has been in normal service for any extended period of time the heat and agitation will cause the olefin polymer to be so dispersed in the grease that the ability of the grease to lubricate rolling parts is, if anything, enhanced.

The mesh can be a woven mesh, for example, a taffeta weave. For example, the mesh can be the surgical mesh disclosed in U.S. 3,054,046. Preferably, the mesh is a molded mesh or a woven mesh wherein the individual threads are joined at their points of contact 23, as illustrated in FIGURE 1 by heat sealing, for example. The individual threads of the mesh can be mono-filaments or multi-filaments, and the thread diameter should be from 0.2 to 30 mils, preferably from 0.2 to 20 mils. The individual threads should be spaced in the mesh at intervals from about 0.5 to 80 mils, preferably from about 1 to about 50 mils. In the embodiment where fiber staple is dispersed in the grease a diameter of 0.2 to 5 mils is particularly suitable. In the embodiment where a sleeve is used a diameter of 1 to 30, preferably 1 to 20 mils is suitable.

Sleeve 22 can be a cylindrical or conically shaped body formed from a single sheet of mesh or a heat formed body as illustrated in FIGURE 1. If sleeve 22 comprises a cylindrical or conically shaped body made from a sheet of the mesh, the ends of the sheet of mesh should overlap at least 1/16 inch along the length of the formed cylinder or cone. However, it is preferred that the sleeve 22 be a heat formed unitary body molded in an appropriate form such as the conically shaped body illustrated in FIGURE 1.

Figure 2:
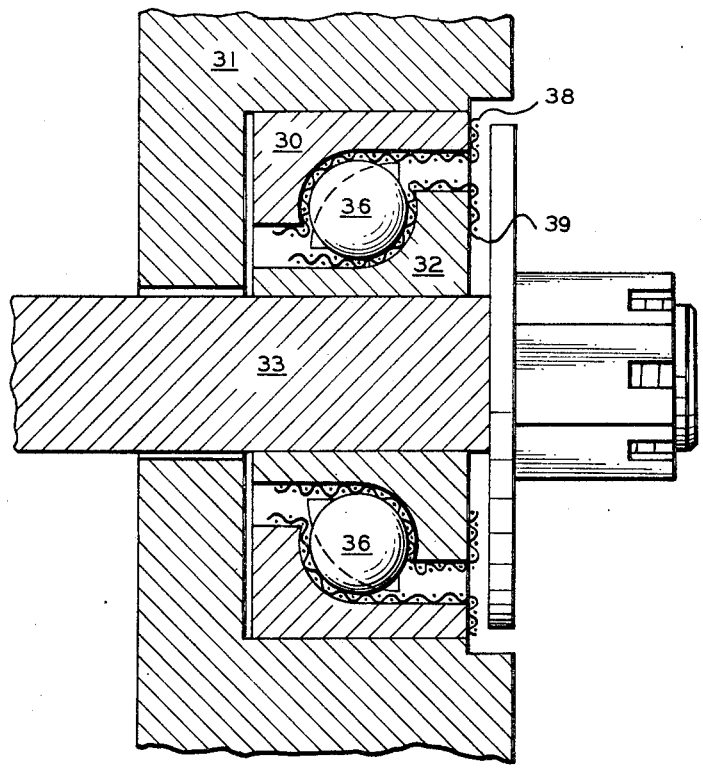
FIGURE 2 is a sectional view of an improved vehicle front wheel bearing of this invention having retained ball bearings which are not fixed to the inner race.

FIGURE 2 is a sectional view of an assembled wheel bearing having retained ball bearings with the sleeves of this invention positioned therein. As illustrated, outer race 30 is pressed within a recess and wheel hub 31. Inner race 32 is positioned on axle 33 and is held thereon by washer 34 and nut 35. Ball bearings 36 disposed within retainer 37 are positioned between outer race 30 and inner race 32. Sleeves 38 and 39 are positioned between the retained ball bearings 36 and outer race 30 and inner race 32 respectively. Thus, sleeves 38 and 39 prevent the direct contact of ball bearings 36 on outer and inner races 30 and 32 respectively.

Figure 3:
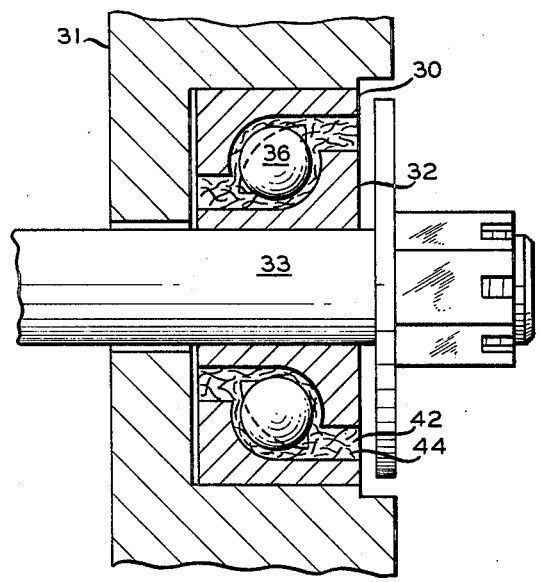
FIGURE 3 is a sectional view of an improved front wheel bearing of this invention packed with a grease containing olefin polymer filaments.

FIGURE 3 is a sectional view of a front wheel bearing identical to that of FIGURE 2 except the bearing is packed with grease 42 having dispersed therein olefin polymer filaments 44.

When assembling the wheel bearings of this invention, the polyolefin sleeves are positioned adjacent the respective races and the retained bearings are then packed with grease in a conventional manner. The grease will pass through the openings in the mesh and freely contact both the race and rolling surfaces. The sleeves of this invention can be inserted after the vehicles to be transported are loaded on the motor or rail carrier or the sleeves can be inserted before loading. In the latter instance, it is preferred that the vehicle not be driven at execessive speeds, nor under rapid acceleration, nor for a distance greater than about one mile from the time the wheel bearing is assembled to the time that is is loaded upon the carrier vehicle.

Alternatively, the bearing can simply be packed with a grease containing filaments made of a normally solid synthetic resinous material selected from the group consisting of polymers and copolymers of mono-1-olefins having 2 to 8 carbon atoms per molecule, prior to shipment of the motor vehicle; such a packed bearing is shown in FIGURE 3. After so packing the bearing, components are assembled in the proper relationship for rolling or service use. That is, after the vehicle containing the improved bearings of this invention reaches its destination it can be removed under its own power and placed immediately into service without inspection, disassembly, or adjustment. In this embodiment too, the vehicle should not be driven excessively prior to shipment.

The sleeve of the polyolefin mesh or dispersed fibers will begin to disintegrate as soon as the wheels of the vehicle are rotated, but if, for example, the vehicle is driven no more than about a mile, at a reasonable rate of less than 20 m.p.h., the mesh or dispersed fibers will be sufficiently intact to prevent substantial contact between the rolling members and the race members. Thus, after the vehicle is loaded upon the carrier and is subjected to the stationary vibratory forces as the carrier itself moves, the aforesaid direct metal-to-metal contact is prevented and thus, the impact damage or fretting corrosion is thereby prevented.

When the carrier reaches its destination, the transported motor vehicles containing the improved bearing of this invention can be removed under their own power as noted hereinbefore and immediately placed into service without inspection of the front wheel bearings. The sleeve of polyolefin mesh or the dispersed olefin polymer filaments will substantially completely disintegrate as the bearing is rotated, and the polymer particles will then freely and compatibly become part of the grease.

Example I

A commercial lithium soap grease was mixed at room temperature with 3 denier polypropylene monofilament. The filaments were about 1/4-inch in length. The polypropylene was predominantly crystalline material having a normal density of 0.905 (ASTM D 1505–63T) and melt flow of 2 (ASTM D 1238–62T, Condition L).

Split fibers made by the fibrillation of an oriented polypropylene film were blended into an additional quantity of the same lithium soap grease in a similar manner. These fibers were about 1/2-inch in length.

Similar blends were made of the same polypropylene monofilament and split fibers in a grease thickened with 5 percent high density polyethylene which had been blended in at a high temperature as disclosed in Mitacek et al., U.S. 3,112,270.

Fafnir Friction Oxidation Tests were made on these formulations and on the base greases without the fibers. The results are as follows:

TABLE I

| Run | Grease | Fiber | Concentration, percent | Weight loss, g. |
|---|---|---|---|---|
| Control | Lithium soap | None | | 0.021 |
| 1 | do | 1/4-inch monofilament | 3 | 0.006 |
| 2 | do | 1/2-inch split fibers | 1 | 0.005 |
| 3 | do | 1/2-inch split fibers | 3 | 0.005 |
| 4 | do | 1/16-inch split fibers | 3 | 0.005 |
| Control | U.S. 3,112,270 | None | | 0.019 |
| 5 | U.S. 3,112,270 | 1/4-inch monofilament | 1 | 0.007 |
| 6 | U.S. 3,112,270 | 1/4-inch split fibers | 3 | 0.007 |

The Fafnir Friction Oxidation Tests subjects a bearing surface to high frequency impact. It is described in "The Institute Spokesman" for June 1952, pages 8 to 15. It is also described in Precision Scientific Company Bulletin entitled "Precision-Fafnir Oscillating Grease Tester" (Mar. 10, 1950). The tests were conducted for 50 hours at 1725 full strokes per minute with an arc of oscillation of the bearing of 12 degrees as disclosed in this bulletin. The weight used was 550 pounds.

These data reveal that in a test simulating impact—as opposed to rolling—friction, the incorporation of the olefin polymer fiber resulted in about a four-fold decrease in wear compared with commercial lithium soap grease, and almost a three-fold decrease compared with the grease of U.S. 3,112,270. It is noted that the Precision Bulletin, dated Mar. 10, 1950, reveals that it was known at that time that automobiles shipped long distances frequently experienced wheel bearing damage. The fact that this problem has remained with the industry up to the present time in spite of the millions of automobiles that have been shipped during this time and the widespread efforts which have been made to solve the problem emphasizes the unexpected and valuable contribution to the art made by the instant invention.

Example II

One weight percent of 3 denier polypropylene filaments having an average length of about 1/2-inch were blended into a grease prepared in accordance with Mitacek et al., U.S. 3,112,270. This grease formulation is used to pack front wheel bearings of automobiles prior to shipment from the factory.

Although certain specific embodiments have been described for the purposes of illustration, they will be clear to those skilled in the art that the invention is not limited thereto.

I claim:
1. A bearing comprising:
   at least one race;
   rolling members; and
   a grease formulation comprising grease and filaments of a normally solid synthetic resinous material se- lected from the group consisting of polymers and copolymers of mono-1-olefins having from 2 to 8 carbon atoms per molecule, said filaments having diameters in the range of 0.2 to 20 mils, and an average length of at least 0.1 inch, said grease formulation being disposed between said race and said rolling members.

2. A bearing according to claim 1 wherein said filaments are present in an amount within the range of 0.1 to 20 weight percent based on the weight of said grease.

3. A bearing according to claim 1 wherein:
said bearing is a front wheel bearing;
said grease contains between 0.5 and 10 weight percent, based on the weight of said grease, of said filaments;
said filaments having diameters in the range of 0.2 to 5 mils, and an average length of at least 0.2 inch; and
wherein said resinous material comprising said filaments is selected from the group consisting of polyethylene, polypropylene, polybutene-1, ethylene- propylene compolymer, and ethylene-butene-1 copolymer.

4. In a vehicle wheel bearing comprising an outer race component, an inner race component, and rolling members disposed between said outer and inner race components, the improvement comprising a sleeve of a mesh made from threads of materials selected from polymers and copolymers of 1-olefins having from 2 to 8 carbon atoms, the individual threads having a diameter in the range of from 1 to 30 mils and being spaced in said mesh at intervals from 0.5 to 80 mils, said sleeve being positioned between said outer race component and said rolling members.

5. The vehicle wheel bearing of claim 4 wherein the individual threads in said mesh are joined at their points of crossing.

6. The vehicle wheel bearing of claim 4 wherein said material is polyethylene having a density from 0.94 to 0.98 gm./cc.

7. The vehicle wheel bearing of claim 6 wherein the individual thread diameters in said mesh range from 1 to 20 mils and the threads within said mesh are spaced at intervals from 1 to 50 mils.

8. The vehicle wheel bearing of claim 4 further comprising a second sleeve of a mesh made from said material positioned between said inner race and said rolling members.

9. A method of preventing impact damage to wheel bearing components having race members and rolling members, when said bearings are on vehicles which are subjected to stationary vibrations, said method comprising:
packing between said race and said rolling members a grease formulation comprising grease and 0.1 to 20 weight percent, based on the weight of said grease, of filaments of a normally solid synthetic resinous material selected from the group consisting of polymers and copolymers of mono-1-olefins having from 2 to 8 carbon atoms per molecule, said filaments having a diameter in the range of 0.2 to 20 mils and having an average length of at least 0.1 inch; and
assembling said components in the proper relationship for service use.

10. A method according to claim 9 wherein:
said bearing components are automobile front wheel bearings;
said grease contains between 0.5 and 10 weight percent, based on the weight of said grease, of said filaments;
said filaments have diameters in the range of 0.2 to 5 mils, and an average length of at least 0.2 inch; and
wherein said resinous material comprising said filaments is selected from the group consisting of polyethylene, polypropylene, polybutene-1, ethylene-propylene copolymer, and ethylene-butene-1 copolymer.

11. A method of preventing impact damage to wheel bearing components in non-rotating wheels on vehicles which are subjected to stationary vibrations comprising inserting between race and rolling members of said wheel bearings a sleeve of a mesh made from threads of materials selected from polymers and copolymers of 1-olefins having from 2 to 8 carbon atoms, said threads having diameters in the range of from 1 to 30 mils and being spaced in said mesh at intervals from 0.5 to 80 mils.

12. The method of claim 11 wherein said material is polyethylene mesh wherein the individual thread diameter ranges from 1 to 20 mils and the threads within said mesh are spaced at intervals from 1 to 50 mils.

13. The method of claim 12 wherein said threads of said mesh are joined at their points of crossing.

References Cited

UNITED STATES PATENTS 1,982,932    12/1934    Scribner.

MARTIN P. SCHWADRON, Primary Examiner

F. SUSKO, Assistant Examiner

U.S. Cl. X.R.

29—148.4; 308—191